United States Patent [19]

Meith et al.

[11] Patent Number: 4,693,233
[45] Date of Patent: Sep. 15, 1987

[54] AIR PREHEATER SYSTEM

[75] Inventors: Hugo C. Meith; Stanley A. McHugh, both of Houston, Tex.

[73] Assignee: Energy Technology, Inc., Houston, Tex.

[21] Appl. No.: 847,927

[22] Filed: Apr. 3, 1986

[51] Int. Cl.[4] .............................................. F24H 3/12
[52] U.S. Cl. .................................. 126/117; 126/110 R; 127/448; 115/134.1; 115/900
[58] Field of Search .................... 126/117, 129, 110 R, 126/110 A, 109, 112, 15 R, 15 A, 21 R, 21 A; 165/DIG. 2, 913, DIG. 28, 134.1; 122/448

[56] References Cited

U.S. PATENT DOCUMENTS

| 1,046,308 | 12/1912 | Kitchen . | |
|---|---|---|---|
| 1,840,836 | 1/1932 | Davis, Jr. | 165/DIG. 1 |
| 2,291,872 | 8/1942 | Brantly | 122/448 |
| 2,488,267 | 11/1949 | Cassie | 165/DIG. 1 |
| 2,499,358 | 3/1950 | Cooper | 165/1 |
| 2,665,840 | 1/1954 | Powell | 165/134.1 X |
| 4,138,062 | 2/1979 | Graden | 120/117 X |
| 4,171,089 | 10/1979 | Schossom | 126/117 X |
| 4,467,780 | 8/1984 | Ripke | 126/110 R |

FOREIGN PATENT DOCUMENTS

| 1441552 | 7/1976 | United Kingdom | 165/DIG. 28 |
|---|---|---|---|
| 560101 | 5/1977 | U.S.S.R. | 165/DIG. 28 |

OTHER PUBLICATIONS

"Ninety-Two Percent Minimum Heater Efficiency by 1980", by H. C. Meith and J. E. Hardie, a peper presented at 44th Refining Midyear Meeting, 5/15/79.

Primary Examiner—Larry Jones
Attorney, Agent, or Firm—Pravel, Gambrell, Hewitt, Kimball & Krieger

[57] ABSTRACT

An air preheater wherein heated combustion gas is caused to flow in a straight path through the full lengths of preheater tubes while controlling the velocity and temperature of such gas to sweep liquid droplets from the preheater. The temperature of the preheated air is regulated by mixing inlet air and preheated air to control the temperature of the metal of the preheater at or near the dew point of the combustion gas to thereby inhibit the formation of large liquid droplets which cannot be removed with the gas moving at its velocity through the preheater, whereby essentially all corrosive liquid is removed with the gas to enable the use of carbon steel in the preheater. The air preheater has a bundle of substantially vertical preheater tubes through which combustion gases pass in a substantially straight flow path. The system normally operates with forced draft but a stack disposed integrally with the tubes enables the system to operate with natural draft when the forced draft is not operational.

4 Claims, 2 Drawing Figures

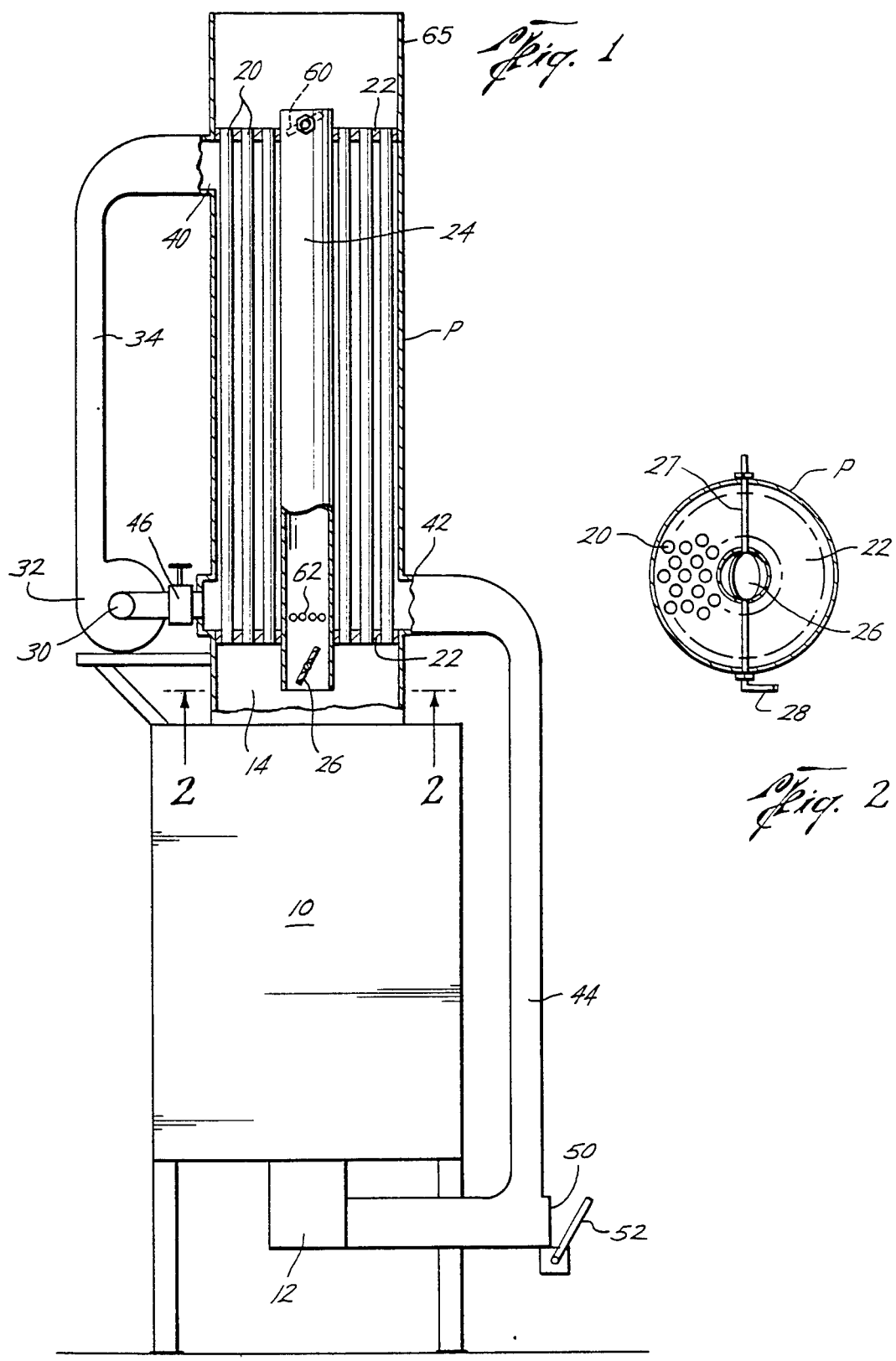

AIR PREHEATER SYSTEM

FIELD OF THE INVENTION

The invention relates to air preheater systems.

BACKGROUND OF THE INVENTION

Combustion air preheaters are well known in the art, examples of which are in U.S. Pat. No. 1,927,215, and in the prior art cited in U.S. Patent Application Ser. No. 205,750, filed Nov. 10, 1980, now abandoned.

It is known that flue gases have a dew point at which the first drop of liquid forms in the gas. The liquid in the flue gases is primarily water. When the liquid forms, it absorbs carbon dioxide which in turn forms $H_2CO_3$ which is very corrosive. Further, almost all fuels have some sulfur so that when the sulfur burns it forms sulfur dioxide and sulfur trioxide, which together with water form sulfurous acid and sulfuric acid. It is also known that the dew point of flue gases is affected by the amount of the sulfur trioxide which is present so that if enough sulfur trioxide is present, the dew point is reached at a much higher temperature, which is above the boiling point of water, which means that higher temperatures must be reached with the combustion or flue gases to prevent the formation of the liquid droplets. The liquid droplets formed at or near the dew point are relatively small, some as small as one micron. However, if the temperature of a vapor falls or is lowered a significant amount below its dew point, or if the vapor contacts a material such as metal that is at a temperature significantly below the vapor dew point, liquid will form at an accelerated rate, causing the liquid droplets to increase in size. If the droplet size is sufficient, then may "rain" or attach to the metal and roll down the side of the metal, such as preheater tubes, on which the droplets are formed. When that occurs, the liquid cannot be removed by the gas flowing over or by the liquid, resulting in a corrosive film on the metal. Because of such corrosive conditions which have been prevalent in the past, expensive metals such as stainless steel have been used in preheaters.

In some situations where preheaters have been used, the ambient temperature of the inlet air to the preheater is so cold that it causes vapors inside of the preheater tubes to condense out because the heat supplied to the preheater from the combustion or flue gases is not enough to heat the metal of the preheater tubes to a temperature above the dew point of the vapor in the tubes. The same situation may occur if the combustion chamber is operated in a low turn-down condition, such that the unit operates as if oversized, i.e. below its rated capacity.

Thus, the preheater itself may be contributing to, or causing, the formation of liquid droplets in the interior of the tubes because of the heat which is transferred from the combustion gas through the preheater tubes to the preheated air, which causes an increase in the temperature of the preheated air, but a consequent decrease in the temperature of the combustion gas in the preheater P.

One of the problems with the prior art is that it has failed to recognize that the size of the droplets can be controlled so that they are small enough for the combustion or flue gas to flow through the preheater at sufficient velocities so long as the flow path is substantially straight to prevent an accumulation of corrosion liquid in the preheater, thereby making it possible to use relatively inexpensive ordinary low carbon steel in the preheater. When changes in direction of the combustion gases such as disclosed in U.S. Pat. No. 2,665,840 occur, they create a centrifuge effect or a dead zone which promotes coalescence of the droplets. When the droplets attach to each other in a dead zone, corrosion occurs.

SUMMARY OF THE INVENTION

The present invention relates to an air preheater system wherein the temperature of the metal in the preheater is kept near the dew point of the liquid in a combustion gas so that liquid droplets of very small size are formed, and the velocity of the combustion gas through the preheater is at a sufficient velocity to entrain the small liquid droplets while maintaining such gas flow in a substantially straight flow path through the preheater, to thereby prevent or inhibit corrosion in the system due to the liquid formed therein. Further, it has been discovered that the size of the liquid droplets formed in the combustion gas side of the preheater tubes can be controlled so that they are extremely small, (e.g. as low as 1 micron) by maintaining the metal of the preheater tubes at or near the dew point of the liquid in the combustion gas. Such control of the metal temperature includes tempering the inlet preheater air by mixing it in recirculation with heated air. By reason of the control to limit the liquid droplets to such a small size, the velocity of the combustion gas is capable of removing the liquid droplets from the preheater to prevent or inhibit corrosion of the preheater tubes.

The air preheater system has an air preheater therewith which normally functions with a plurality of vertical tubes, without any turns or bends therein, so that the sweep velocity and temperature of the combustion gases passing through such tubes inhibits or prevents the formation of large droplets of water or corrosive liquids, whereby the tubes may be formed of ordinary carbon steel, which is less expensive than stainless steel or other more exotic types of metals.

The system normally operates using a forced draft blower or fan, but in the event the fan or blower for the system fails, the system is still operable by a natural draft flow of air, with the velocity of the combustion gases through a central stack being maintained to prevent corrosion of the stack. The stack itself can be closed off and/or pressurized with preheated air when the system is operated with a forced draft fan or blower to prevent the flow of combustion gases therethrough thereby inhibiting corrosion of the stack during the forced draft operation of the system. When the system is operated with the natural draft air, the velocity of the combustion air through the stack is sufficient to prevent corrosive action by liquid droplets and therefore, the stack may also be formed of ordinary carbon steel to further reduce the cost of the apparatus of this invention.

BRIEF DESCRIPTION OF THE DRAWINGS

FIG. 1 is an elevational view of the air preheater system of the present invention wherein a natural draft stack is mounted internally of preheater tubes; and FIG. 2 is a cross-sectional view taken along line 2—2 of FIG. 1 showing the relationship of the natural draft stack and the preheater tubes.

DESCRIPTION OF A PREFERRED EMBODIMENT

In the drawings, a preheater P is shown mounted on a combustion chamber 10 which may have many different constructions. Essentially, the chamber 10 includes conventional burners (not shown) in the chamber 10, with a combustion air inlet 12 and a combustion gas outlet 14. The burners are located in proximity to the air inlet 12.

The preheater P is a shell and tube heat exchanger having vertically extending tubes 20 that are in fluid communication with the combustion gas outlet 14. Such tubes 20 are typically mounted in and supported by circular tube sheets 22 located at the ends of the tubes 20 in the preheater P. The combustion gases from the combustion chamber 10 flow vertically upwardly through the preheater tubes 20 which are formed without any turns or changes in the direction of flow of the combustion gases to provide a substantially straight flow path for the combustion gas therethrough, and at sufficient velocity to sweep out particulate matter and mists from the preheater tubes 20 to thereby prevent or inhibit corrosion of the tubes 20. Thus, the tubes 20 can be made of ordinary carbon steel.

In the preferred form of the invention, the preheater tubes 20 surround an exhaust stack 24 that is integrally positioned with the tubes 20 in the preheater P. The exhaust stack 24 may be in fluid communication with the combustion gases outlet 14 or it may be closed to such combustion gases, as will be explained. In FIG. 1, the relative diameter of the shell of the preheater P as compared to the stack 24 is exaggerated to more easily illustrate the tubes 20.

A positive sealing damper 26 which has very low leakage is pivotally mounted at the inlet to the exhaust stack 24 for movement to and from open and closed positions. When in the closed position, it diverts combustion gases from the exhaust stack 24 to the preheater tubes 20 during the forced draft operation of the system. When the preheater P is not operational, the positive sealing damper 26 is opened by turning it with the handle 28 on the pivot rod 27 to the position shown in the drawings, thus allowing combustion gases to pass through the exhaust stack 24 and essentially operates in parallel to the preheater tubes 20.

Combustion air is forced through the shell side of the preheater P by a forced draft fan 32 that has an air inlet 30. The fan 32 forces air upwardly through duct 34 for passage through an inlet port 40 into the shell side of the preheater P. Heated combustion air flows from an outlet plenum 42 through duct 44 to the air inlet 12 of the burner at the bottom of the combustion chamber 12. Normally, a valve 46 adjacent the blower 32 is closed, but it can be opened fully or partially so that the preheated air can be partially recycled in varying volumes by the forced draft fan 32 pulling a portion of the preheated air from the shell side of the preheater through valve 46 to thereby increase the temperature of the combustion air for preventing or inhibiting condensation of liquid and mists within the preheater tubes 20.

Such tempering of the preheater air is especially important where the ambient temperature of the preheater air entering inlet 30 is low enough so that it would cool the metal of the preheater tubes 20 enough to cause condensation of large liquid droplets on the inside of the tubes 20, particularly at the upper ends where the preheater air initially contacts the tubes 20, unless steps were taken to avoid such condensation. That is avoided with this system by the controlled partial recycling of the preheated air and mixing it with the ambient inlet air, as explained above, so that the temperature of the preheated air entering the preheater P at port 40 is warm enough to avoid the formation of excessively large liquid droplets inside the tubes 20.

For natural draft operation of the system, a natural draft inlet 50 is provided which has a door 52 preferably located near the combustion air inlet 12. The door 52, and thus the inlet 50, is closed during the forced draft operation of the preheater, but may it be opened to admit combustion air when the fan or blower 32 fails or is inoperative for any reason.

The exhaust stack 24 has a sufficient diameter and height to accommodate the desired natural draft and extends above the preheater P. It is to be noted that the outer wall 65 of the preheater P preferably extends from the combustion chamber 10 or any convection section above it to a point some distance above the upper end of the stack 24. Such arrangement maintains the velocity and straight flow path of the combustion gas as it leaves the tubes 20 so that the external surface of the stack 24 is likewise not subject to corrosion by the exiting gas. To prevent internal corrosion of the exhaust stack 24 during normal forced draft operation of the preheater P, the exhaust stack 24 may be provided with a top damper or closure 60 which is also pivotally mounted for movement to and from open and closed positions as illustrated for damper 26, or in any other suitable manner. During the forced draft mode, damper 60 is normally closed. Such damper 60 may be in addition to or in place of the damper 26.

Small holes 62 are preferably located near the bottom of the exhaust stack 24 within the shell side of the heat exchanger P so that preheated inlet air passing through the shell side of the preheater P slightly pressurizes the exhaust stack 24 when the sealing damper 26 and the top closure 60 are in closed positions. Such pressurization of the exhaust stack 24 serves to prevent the entry of combustion gases into the exhaust stack 24 when the preheater is operating with the forced draft. Such condition of the stack inhibits or prevents corrosion of the exhaust stack 24 during forced draft operation, thereby enabling it to also be made of ordinary carbon steel.

The bottom damper 26 may be used alone and without such pressurization internally of the stack 24, providing the stack is warm enough to prevent corrosion. Also, the upper damper 60 may be used without the lower damper 26 if the pressurization is used to keep the combustion gases out of the stack 24.

During normal forced draft operation of the preheater P, the sealing damper 26 is in the closed position extending across the lower opening of the stack 24, and diverts substantially all of the combustion gases through the preheater tubes 20. Also, the natural draft inlet 50 is closed by the pivoted draft door 52 so that combustion air is supplied entirely by the forced draft fan 32 through the preheater P. The combustion air can be recycled as desired using valve 46 to control the temperature of the preheated gases on the shell side of the preheater P to thereby control the temperature of the combustion gases flowing through the tubes 20, as explained above. By maintaining the temperature of the combustion gases high enough and the sweep velocity thereof high enough and straight through the tubes 20, the liquid droplets or mists which would otherwise cause corrosion on the inside of the tubes 20 are prevented or inhibited, or are swept out by the velocity of the gas flow. As the temperature of the tubes 20 is increased with respect to the dew point of the liquid in the combustion gases, the velocity of the combustion gases flowing therethrough may be reduced while still inhibiting corrosion in the tubes 20.

The control of such temperature and sweep velocity is within the skill of those skilled in the art. With respect to this invention, the temperature of the metal tubes 20 in the preheater P should be kept near the dew point of the liquid in the combustion or flue gas. Preferably, that metal temperature range is between about 10° F. and about 100° F. below the dew point of the flue gas, which can be controlled by the tempering of the combustion air, as previously explained.

The velocity of the combustion or flue gas to cause the sweep effect on the small liquid mist thus formed when the metal of the tubes 20 is kept at or near the dew point of the gas by keeping the metal temperature within the preferred range, is preferably in the range of about 10 ft./sec. to about 100 ft./sec.

It is important to understand that in general there is a relationship between the metal temperature and the flue gas velocity, with the flue gas velocity of about 10 ft./sec. approximately matching the metal temperature of about 10° F. below the dew point, and the flue gas velocity of about 100 ft./sec. approximately matching the 100° F. below the dew point, and with corresponding temperatures and velocities within such ranges.

It has been discovered that by controlling such relationship between the metal temperature and the flue gas sweep velocity, the liquid droplets or mists which would otherwise cause corrosion on the inside of the tubes are prevented or inhibited, or are swept out of the tubes by the velocity of the gas flow.

Such velocity control of the gas is accomplished with a blower or fan 32 of sufficient static pressure to overcome pressure loss in the preheater due to the relatively high gas velocity, as will be understood by those skilled in the art.

When blower or fan 32, and thus the preheater P, is not operational, the natural draft inlet 50 is opened to provide combustion air to the direct fired heater H. Also, the sealing damper 26 and top damper 60 are opened to allow combustion gases to pass through the exhaust stack 24 by natural draft.

The present invention thus provides an air preheater system, wherein the flow of the combustion gases is vertically straight through the preheater tubes at a sufficient velocity and temperature to remove droplets of water or corrosive liquids in the gases. In the event the blower or fan 32 fails so that the forced flow of the preheater air cannot be accomplished, the apparatus of this invention provides for a natural draft inlet of fresh combustion air into the combustion chamber 10 and the flow of the combustion gases through the discharge stack 24. Even though the apparatus of this invention is then on a natural draft flow of the combustion gases, the temperature of the combustion gases and the sweep velocity is sufficient to prevent or inhibit the formation of liquid droplets or corrosive liquids within the stack 24. Since all or essentially all of the flow of the combustion gases, when under natural draft operation, is through the stack 24, corrosion action by liquid droplets in the tubes 20 does not occur either.

Since the stack 24 is preferably located centrally with respect to the tubes 20, the heat of the combustion gases passing through the stack 24 serves to maintain the temperature of the tubes 20 high enough to prevent liquid condensation in the tubes 20 when the apparatus is on the natural draft operation. Thus, even though the sweep velocity is reduced through the tubes 20 when the natural draft operation is taking place, the temperature within the tubes 20 is maintained sufficiently high to prevent or inhibit the formation of droplets or other corrosive liquids within the tubes 20 because no heat is removed by the air since the air blower is off. Also, an alternative arrangement where the stack is integral with the bundle of tubes would have the stack in the form of a cylinder surrounding and spaced from the outer shell of the preheater.

Whether the system of this invention is on the forced draft or the natural draft cycle, the corrosion of the tubes 20 and also the stack 24 is prevented or inhibited so that the relatively economical carbon grade steel can be used for both the tubes 20 and the stack 24. It is also important to note that there are no turns or changes in direction of the vertical tubes 20 and the stack 24 throughout their full lengths, because such would cause dead spaces or retard flow of the combustion gases sufficiently to result in potential corrosion of the tubes 20 or stack 24.

The foregoing disclosure and description of the invention are illustrative and explanatory thereof, and various changes in the size, shape and materials as well as in the details of the illustrated construction may be made without departing from the spirit of the invention.

What is claimed is:

1. A preheater system, comprising:

a combustion chamber;

a preheater located above the combustion chamber and having a series of parallel substantially vertical preheater tubes to provide a substantially straight flow path for combustion gas for the full length of each of said tubes;

means for controlling the velocity and temperature of the combustion gas as it flows in said substantially straight flow path for the full lengths of the tubes to sweep liquid droplets out of the tubes with the combustion gas as it exits from the tubes to inhibit corrosion of the interior of the tubes by liquid droplets; and said means for controlling the velocity and temperature of the combustion gas controlling the temperature of the preheater tubes between about 10° F. to about 100° F. below the dew point of the combustion gas and also controls the gas velocity in a range from about 10 ft./sec. to about 100 ft./sec., with such velocity varying in amounts which substantially correspond to the variations in the tube temperature range.

2. The preheater system of claim 1, including:

a blower for normally transferring heat from combustion gases to combustion air; and an exhaust stack disposed integrally with the preheater tubes for the flow of the combustion gases therethrough by natural draft when the blower is inoperative.

3. A preheater system having both natural draft and air preheating capabilities, comprising:

a combustion chamber having a combustion gas outlet and a combustion air inlet;

a shell and tube heat exchanger having vertically extending tubes in fluid communication with the combustion gas outlet;

an exhaust stack extending vertically and disposed integrally with the shell and tube heat exchanger and having an open lower end in communication with the combustion gas outlet;

forced draft means for supplying combustion air in fluid communication with the shell side of the heat exchanger; and means for tempering the temperature of the combustion air in the preheater by recycling a part of the combustion air and mixing it with the ambient inlet air to inhibit forming large liquid droplets in the preheater tubes which cannot be removed by the flowing combustion gas at the temperature and velocity thereof.

4. A preheater system, comprising:

a combustion chamber;

a preheater located above the combustion chamber and having a series of parallel substantially vertical preheater tubes to provide a substantially straight flow path for combustion gas for the full length of each of said tubes;

means for controlling the temperature of the interior walls of the tubes in a range between about 10° F. to about 100° F. below the dew point temperature of the combustion gas; and means for causing the combustion gas to flow through said tubes at a velocity in a range of about 10 ft./sec. to about 100 ft./sec., with such velocity varying in amounts which substantially correspond to the variations in the tube temperature range.

* * * * *